US011031045B2

(12) United States Patent
Silvestri et al.

(10) Patent No.: US 11,031,045 B2
(45) Date of Patent: *Jun. 8, 2021

(54) SYSTEMS AND METHODS FOR MEDIA PRODUCTION AND EDITING

(71) Applicant: Evertz Microsystems Ltd., Burlington (CA)

(72) Inventors: Vince Silvestri, Burlington (CA); Stephen Michael D'Angelo, Waterdown (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,058

(22) Filed: Sep. 27, 2019

(65) Prior Publication Data

US 2020/0027483 A1 Jan. 23, 2020

Related U.S. Application Data

(63) Continuation of application No. 15/961,055, filed on Apr. 24, 2018, now Pat. No. 10,468,067.

(Continued)

(51) Int. Cl.
*G11B 27/34* (2006.01)
*G11B 27/036* (2006.01)
*G11B 27/031* (2006.01)
*H04N 21/2187* (2011.01)
*H04N 21/8547* (2011.01)
*G11B 27/32* (2006.01)
*H04L 29/06* (2006.01)
*H04L 29/08* (2006.01)

(52) U.S. Cl.
CPC ............ *G11B 27/34* (2013.01); *G11B 27/031* (2013.01); *G11B 27/036* (2013.01); *G11B 27/323* (2013.01); *H04L 65/4076* (2013.01); *H04L 65/607* (2013.01); *H04L 67/1097* (2013.01); *H04N 21/2187* (2013.01); *H04N 21/8547* (2013.01)

(58) Field of Classification Search
CPC ............. H04L 67/1097; H04L 65/4076; H04L 65/607; H04N 21/2187; H04N 21/8547; G11B 27/031; G11B 27/323; G11B 27/036; G11B 27/34
See application file for complete search history.

(56) References Cited

U.S. PATENT DOCUMENTS 10,468,067 B2 11/2019 Silvestri et al.
2007/0239787 A1* 10/2007 Cunningham ........ G06F 3/0482
(Continued)

Primary Examiner — Thai Q Tran
Assistant Examiner — Jose M Mesa
(74) Attorney, Agent, or Firm — Bereskin & Parr LLP/S.E.N.C.R.L., s.r.l.

(57) ABSTRACT

The various embodiments disclosed herein relate to systems and methods for generating a derived media clip corresponding to a live event. In particular, the system comprises a processor configured to receive a plurality of content streams corresponding to the live event, each content stream corresponding to a content source. The processor is further configured to generate an annotated timeline for one or more of the plurality of content streams and receive a first user input requesting the derived media clip. The processor is then configured to generate the derived media clip based on the user input and the annotated timeline.

14 Claims, 9 Drawing Sheets

Related U.S. Application Data

(60) Provisional application No. 62/488,910, filed on Apr. 24, 2017, provisional application No. 62/488,905, filed on Apr. 24, 2017.

(56) References Cited

U.S. PATENT DOCUMENTS

| | | | |
|---|---|---|---|
| 2011/0131496 A1* | 6/2011 | Abram | G11B 27/034 715/722 |
| 2012/0166289 A1 | 6/2012 | Gadoury et al. | |
| 2018/0176661 A1 | 6/2018 | Varndell et al. | |

* cited by examiner

SYSTEMS AND METHODS FOR MEDIA PRODUCTION AND EDITING

CROSS-REFERENCE TO RELATED APPLICATIONS

This application is a continuation of U.S. patent application Ser. No. 15/961,055 filed Apr. 24, 2018, which claims benefit of U.S. Provisional Patent Application No. 62/488,910 filed Apr. 24, 2017 and U.S. Provisional Patent Application No. 62/488,905 filed Apr. 24, 2017. The entire contents of U.S. patent application Ser. No. 15/961,055, U.S. Provisional Application No. 62/488,910 and U.S. Provisional Application No. 62/488,905 are incorporated by reference herein.

FIELD

The described embodiments relate to systems and methods for improving media production and editing for playback, and in particular, to systems and methods for improving media production and editing by generating an annotated timeline of a media clip being produced.

BACKGROUND

In many areas of television broadcasting, and sports broadcasting in particular, live feed of an event is often provided to the viewers using a production team operating a production switcher. In most cases, the viewers are also interested in watching highlights or replays of interesting plays either shortly after the occurrence of the interesting play in the event, during break time (e.g. half time) or shortly after the event ends.

Typically, live events, such as sporting events, public speeches (e.g. presidential speeches), concerts etc. are covered by a production teams, usually situated in a productions truck. In a production truck, there are usually numerous monitors on a wall, a production switcher with a 1,000+ buttons on a desk, a person operating the production switcher ("technical director") and a director or producer responsible for instructing the operation of the production switcher to produce a media clip (e.g. a highlight clip, a playback clip etc.). Usually, the director watches the monitors on the wall that are receiving live streams or angles of the event from different sources, and tells the technical director what to do, such as "go to input 5" or "fade to input 7" etc. The technical director operates the production switcher to put any camera, person, or replay in the media clip being produced by pressing the right buttons. The director plans at least four or five steps ahead and makes sure all the important things in the event are caught and included in the highlight or playback feeds. Typically, the production team also has an audio consultant who makes sure that the audio is properly synchronized with the video being displayed.

Typically, when a media clip is produced by the production team, the clip is then broadcasted on various platforms, for example, television, internet etc. Since the clip is produced either simultaneously as the event or shortly after the event ends, the clip is typically produced in a rush for an immediate release. Consequently, the produced clip may have glitches, such as, missing footage from the event, synchronization issues between the video and the audio, incorrect order of footage etc.

A media clip produced in this manner, using a traditional production switcher, cannot be easily corrected or reworked. In order to create an accurate media clip, or make changes to the existing media clip, the production work has to be typically restarted from scratch. Such an approach is labor, time and cost intensive.

SUMMARY

In a first aspect, in at least one embodiment, there is provided a method of generating a derived media clip corresponding to a live event. The method comprises: receiving a plurality of content streams corresponding to the live event, each content stream corresponding to a content source; generating an annotated timeline for the plurality of content streams, the annotated timeline comprising a plurality of channels, each channel comprising: a portion of at least one content stream from the plurality of content streams, wherein the portion of the at least one content stream comprises at least two media frames, the portion comprising a start timing reference and an end timing reference, the start timing reference corresponding to a start timecode and the end timing reference corresponding to an end timecode, the start timecode corresponding to a first time reference on the annotated timeline, the end timecode corresponding to a second time reference on the annotated timeline, the second time reference being later in time than the first time reference; receiving a first user input comprising a queried start timecode, a queried end timecode, and at least one queried channel, the queried start timecode corresponding to a first queried time reference on the annotated timeline and the queried end timecode corresponding to a second queried time reference on the annotated timeline; and generating the derived media clip based on the first user input by: identifying one or more channels of the annotated timeline corresponding to the at least one queried channel, for each identified channel, identify corresponding one or more media frames that overlap with the queried start timecode and the queried end timecode in the first user input, and for all the one or more identified channels, combining the corresponding one or more media frames using one or more operations to generate the derived media clip.

In some embodiments, the plurality of content streams may be synchronized relative to a common timebase.

In some embodiments, the method comprises receiving a second user input comprising a first identifier corresponding to a first content stream being received from a first content source and a second identifier corresponding to a second content stream being received from a second content source, the first content stream corresponding to the portion of the at least one content stream on the annotated timeline, replacing the first content stream in a first channel for the second content stream in the first channel on the annotated timeline, and if the first channel is in the at least one queried channel, updating the derived media clip with the second portion of the second content stream.

In some embodiments, the content stream is selected from a group consisting of a live media stream, a live audio stream, and a live data stream.

In some embodiments, the content stream further comprises a non-live media stream receivable from a storage server.

In some embodiments, the non-live media stream comprises a third-party content stream.

In some embodiments, the method comprises transmitting the derived media clip to the storage server.

In various embodiments, the one or more operations to generate the derived media clip are selected from the group consisting of combining the one or more media frames side-by-side, combining the one or more media frames to provide video-in-video, combining the one or more media frames to show a transition between two content streams, combining the one or more media frames to fade between two content streams, and combining the one or more media frames while muting the audio of a content stream.

In a second aspect, in at least one embodiment described herein, there is provided a system of generating a derived media clip corresponding to a live event. The system comprises: a processor unit; a display device; and a memory unit coupled to the processor unit and configured to store instructions executable by the processor unit; the processor unit being configured to: receive a plurality of content streams corresponding to the live event, each content stream corresponding to a content source; generate an annotated timeline for the plurality of content streams, the annotated timeline comprising a plurality of channels, each channel comprising: a portion of at least one content stream from the plurality of content streams, wherein the portion of the at least one content stream comprises at least two media frames, the portion comprising a start timing reference and an end timing reference, the start timing reference corresponding to a start timecode and the end timing reference corresponding to an end timecode, the start timecode corresponding to a first time reference on the annotated timeline, the end timecode corresponding to a second time reference on the annotated timeline, the second time reference being later in time than the first time reference; receive a first user input comprising a queried start timecode, a queried end timecode, and at least one queried channel, the queried start timecode corresponding to a first queried time reference on the annotated timeline and the queried end timecode corresponding to a second queried time reference on the annotated timeline; and generate the derived media clip based on the first user input by: identifying one or more channels of the annotated timeline corresponding to the at least one queried channel, for each identified channel, identify corresponding one or more media frames that overlap with the queried start timecode and the queried end timecode in the first user input, and for all the one or more identified channels, combining the corresponding one or more media frames using one or more operations to generate the derived media clip.

In some embodiments, the instructions cause the processor to perform the methods as described above or other methods in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and which will now be briefly described.

Figure 1:
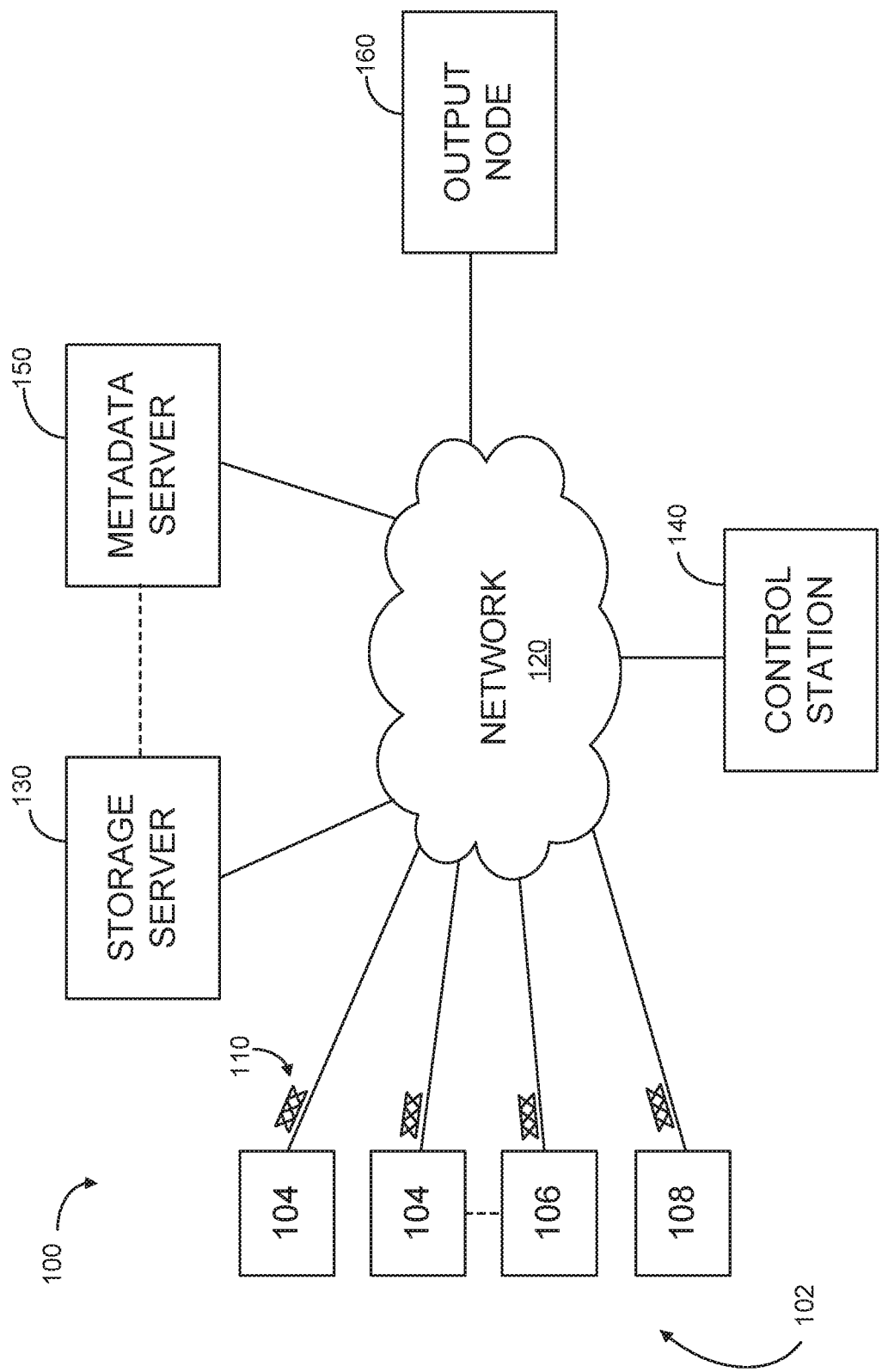
FIG. 1 illustrates an example of a system 100 for generating and managing a derived media clip.

Further aspects and advantages of the embodiments described herein will appear from the following description taken together with the accompanying drawings.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, mobile telephone, smartphone or any other computing device capable of being configured to carry out the methods described herein.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

As the term module is used in the description of the various embodiments, a module includes a functional block that is implemented in hardware or software, or both, that performs one or more functions such as the processing of an input signal to produce an output signal. As used herein, a module may contain sub-modules that themselves are modules.

The various embodiments described herein generally relate to systems and methods for improving media production and editing process for playback in a cost effective, time efficient and seamless manner. In particular, the systems and methods of various embodiments described herein relate to improving media production and editing process by generating an annotated timeline of a produced media clip.

The annotated timeline of the produced media clip includes a timebase reference annotated with identifiers for various media clips, media frames, audio clips, event data and other related data, etc. This annotated timeline provides a correlation between a time reference and content to be displayed at those times. In some examples, the annotated timeline may be provided in the form of a list or a chart.

Reference is first made to FIG. 1, which illustrates an exemplary system 100 for generating and managing derived media clips. System 100 comprises a plurality of content sources 102, a network 120, a storage server 130, a metadata server 150, a control station 140, and an output node 160.

Content sources 102 may include a variety of sources providing content associated with a live event, such as a sporting event, a concert, a debate, a speech etc. Content sources 102 provide respective content signals 110. In most cases, the content signals 110 are live content signals.

Content sources 102 may include media sources 104 which include sources of video and/or audio associated with the live event. For example, a media source 104 may be a television camera or a film camera covering an event from different angles. Media source 104 may also be an audio capture device, such as a microphone, which may produce an audio output signal.

Media sources 104 may also include a network file server or media servers storing media clips associated with the event generally, or associated with the participants of the event etc. Media sources 104 may also include handheld devices, e.g. PDA, cell phones, tablets, laptops and other such devices that individuals can bring to an event and use for recording the event.

Content sources 102 may also include data sources 106. Data sources 106 may provide data associated with the event, such as, scoreboard data, any associated breaking news data, data about the event being posted or tweeted about on social media platforms such as Facebook, Twitter etc., time data, etc.

Content sources 102 may also include advertisement sources 108. Advertisement sources 108 may include data provided by advertisers or producers of the event and may include content such as logos, advertisements, product placement information etc. Such data may not be directly related to the event but may need to be incorporated in the highlight or playback derived media clips for business reasons. In some cases, advertisement sources 108 may provide live streams of pre-produced content directly from production houses and/or advertiser facility.

Content sources 102 may include other sources of live content associated with the live event. For example, content sources 102 may be some other production truck or team generating a highlight, replay or other derived media clip for the live event. Content streams 110 received from such content sources 102 may include highlight, playback or other derived media clip generated by other parties.

The content sources 102 may content signals 110, which may be transmitted using a Serial Digital Interface (SDI) or High Definition Serial Digital Interface (HD-SDI). In some cases, a content source 102 may comprise a plurality of input interfaces; for example, to receive video input with a 4K resolution, several SDI inputs may be grouped together, transmitted via a suitable interface.

In some cases, particularly where there are a plurality content media sources 102 capturing video of a live event, the content sources 102 may be synchronized relative to a common timebase (e.g., using a GPS-based clock, a reference timing signal, etc.) and timecodes may be generated and embedded within the content signals 110 to provide common references if and when the media signals are later edited.

Many forms of timecodes can be provided. The Society of Motion Picture and Television Engineers (SMPTE) defines multiple timecode standards. For example, a video signal may have Vertical Interval Time Codes or "VITC" timecodes embedded within the vertical blanking interval. In some cases, the term "timecode" or "time code" may refer to a plurality of timecode packets associated with a particular video stream. Each timecode packet may correspond to a particular frame of video, and the timecode packets may be collectively referred to as the "timecode" of the stream. A timecode reference may be a timing reference associated with a particular point in time, as referenced to the timecode of the stream.

Optionally, a media router may be provided in the system 100 to route content signals 110 from content sources 102 to a control station 140. Media router generally has a plurality of input ports and output ports. Each of the content sources 102 may provide a content signal 110 (e.g., video and/or audio) to media router at one of the input ports, for example using an SDI interface. Media router may be configured to switch signals received at an input port to an output port under the control of network 120. Media router can be coupled to control station 140 to receive router control signals.

In some cases, optionally, a media encoder may be coupled to each of the output ports of the media router. Each media encoder may receive an input media signal (e.g., video input signal) and encode it to provide a corresponding encoded media stream (e.g, compressed digital video signal). In some cases, when encoding the media stream, the media encoder may extract timecode packets embedded within the input media signal and re-embed corresponding timecode packets in the encoded media stream. The embedded timecode packets may be associated with each individual media frame, or may be inserted in the media stream at predefined intervals. In some cases, additional timecode packets may be generated and embedded based on timecode references from existing timecode packets and a known frame rate of the media stream.

Network 120 may be any wireless network capable of carrying data, including the Internet, satellite, mobile, Wi-Fi, WiMAX, Bluetooth® communications network, passive or active RFID network, infrared light detection and emission communication network, local area network, wide area network etc., between the various devices illustrated in the Figures and described herein. Content may be received and transmitted by the network 120 in the form of a transport stream. For example, content may be received by the network 120 in the form of a Motion Picture Experts Group (MPEG) Transport Stream according to the MPEG-2 or other standards. Similarly, the content streams received by the network 120 from various content sources 102 generally comprise media frames (e.g., video frames or audio frames) encoded in a media compression format, such as that defined in the MPEG-2, MPEG-4 or JPEG2000 standards.

In some cases, the content signals 110 of content streams are transmitted to storage server 130 via network 120 for storage. Storage server 130 may comprise one or more computer servers, each comprising at least a processor, a network interface and a storage memory. In particular, storage server 130 may be configured to provide a scalable distributed storage system (e.g., "cloud" storage) in which storage server 130 comprises multiple nodes or computers connected via a network. For example, storage server 130 may be configured to provide a NoSQL database storage scheme. In some embodiments, storage server 130 may comprise one or more encoders, for encoding or re-encoding content streams.

Storage server 130 may store content streams or signals 110, containing media streams, data streams and other miscellaneous streams, as received from content sources 102, in a separate file or record. In some cases, the incoming content streams 110 may be edited to add metadata to certain portions of the stream and the annotated content streams 110 may then be saved on the storage server 130. In such cases, the metadata information may be saved on the metadata server 150 as discussed below.

In some cases, the incoming media streams 110 may not be time synchronized to a common timebase. In such cases, the content streams 110 may be processed so that the timing references within the incoming content streams 110 are converted into the common timebase before saving them on the storage server 130 and/or metadata server 150.

In some cases, the incoming content streams 110 are saved as a whole in the storage server 130. In some other cases, the content streams 110 are saved as clips of smaller sizes. In some further cases, some of the content streams 110 may be saved as individual frames in the storage server 130.

Storage server 130 may also contain other media streams, media clips, media frames, data streams and/or other ancillary streams or information in general. Such content may be provided to the storage server 130 from a third party. Such content may also be received by the storage server 130 at previous one or more events. Furthermore, such content may include derived media clips, as discussed herein, generated by using one or more content streams 110 either alone or in combination with content previously stored in the storage server 130.

Storage server 130 may additionally include other miscellaneous content, such as advertiser content, including logos, promotional videos, advertisements etc. Such content may be previously provided to the storage server 130 by third party servers. Storage server 130 may also include pre-produced clips, such as a 'replay' clip, which is usually played before a replay starts.

In this application, the content stored in the storage server 130 is referred to as content object, and each content object may be a stream, a clip or a frame only, and may include audio-visual information, data information and/or other ancillary information (such as control information).

A content identifier may be generated and associated with each stored content object. In some cases, the content identifier may be a randomly generated unique identifier, such as a universally unique identifier (UUID). In other cases, the content identifier may identify, for example, the content source from which the content object originated. The content identifier may also identify a date and time associated with the content object, or other metadata. Generally, the transport stream of a content object may be removed when stored by storage server 130. However, in some cases, the transport stream may be retained.

In general, the storage server 130 may be searchable, for example, from control station 140 via a suitable search interface.

Metadata server 150 may comprise a processor, a network interface and a storage memory. The storage memory may comprise a metadata database, which may in some cases be a relational database configured to store metadata relating to the media streams stored by storage server 130. In some embodiments, storage server 130 and metadata server 150 may be merged, or provided at the same physical device. For example, storage server 130 may perform some or all of the functions of metadata server 150, or vice versa.

The metadata database may contain records corresponding to each of the content object stored in the storage server 130. The records may identify, for example, the content source from which the content object originated, a date and time associated with the content object, encoding format and other metadata. The metadata database may also generate and associate unique identifiers with each frame in the respective content object. Each record may comprise a description field that can store arbitrary text or tags describing the recorded content, to facilitate searching and retrieval (e.g., by a human operator). For example, if a metadata stream comprises media frames that record a touchdown scored by John Smith in a football game, then metadata records for the media frames may comprise metadata such as "touchdown", "4th quarter", "player number 33", "Smith, John", "Green Bay", etc. For media clips, additional metadata may include a clip author, a real time creation date, a timecode creation time, in/out points for the clip, a clip name, an identifier of the machine on which the clip was created, a primary media source from which the clip was created, etc.

In general, the metadata database may be searchable, for example, from control station 140 via a suitable search interface.

It will be appreciated that any number of metadata tags or descriptions can be applied, although in some cases these may be limited to certain predefined tags to enforce uniformity.

In some embodiments, every frame of every content object, such as media streams, may have a corresponding record in the metadata database. Media frames may be generally intra coded frames, that is, frames coded without reference to any other frame except themselves, to facilitate random access to any point in the respective media streams. However, in some cases, frames may also be predicted frames. For example, if media frames are encoded in the MPEG-4 Advanced Video Coding standard, then the media frames may be generally of the I-frame type. However, in some cases, the media frames may also comprise P- or B-frames.

The frame record may comprise, for example, a timing reference identified in the timecode packet of the frame and a frame identifier for retrieving the frame from storage server 130 (e.g., byte offset, file offset, timecode offset, frame number, etc.).

The metadata database may further contain records defining media clips. Media clips may be created and edited, for example, by control station 140. Each media clip record may contain an indication of the content stream and frames that comprise the media clip. The record may be constructed based on timecode references of frames, references to specific frames (e.g., by frame count). Moreover, each media clip record may refer to more than one content object. In some cases, media clips may reference other media clips.

Accordingly, when a media clip is to be played back or otherwise output, the requesting control station 140 may first query the metadata database to retrieve the media clip record, identify the content object(s) required to construct the media clip, and subsequently request the corresponding content objects from the storage server 130. The received frames can then be assembled in the appropriate sequence (indicated in the media clip record) prior to output or playback.

Output node 160 is generally capable of receiving content from network 120 and generating an output video stream, for example, to be broadcast. Output node 160 may receive content from storage server 130 (e.g., content streams or media clips), and generating an output video stream. Output node 160 may also receive content directly from control station 140 as a new media clip is being produced from the content streams received from content sources 102 and/or content objects received from the storage server 103. In addition, in some embodiments, output node 160 may be provided as part of control station 140 or at other locations in the system. Output node 160 may in some cases be referred to as a playout node.

Control station 140 may comprise one or more computing devices comprising a processor, a memory, a display, a network interface and an input device capable of being operated by an operator. For example, control station 140 may be a computer workstation, a laptop computer, a tablet computer, etc. Computing devices within the control station 140 may comprise a local storage database or server, a display and a processor. Control station 140 can be communicatively coupled to content sources 102, storage server 130, metadata server 150 and output node 160 through network 120. In some cases, control station 140 may comprise an output node 160.

System 100 may be deployed, for example, at a sports stadium. In that embodiment, content sources 102 may be video cameras 104 capturing various angles of a sporting event and producing audio-video signals. In addition, content sources 102 may include data sources 104, such as stadium clock scoreboard and digital signage located throughout the stadium, to provide data signals corresponding to the sporting event. Content sources 102 may further include advertiser data for individuals or companies sponsoring the sporting event, and may include logos, promotions, advertisements, etc. for those advertisers. This embodiment is further explored in FIGS. 3A-3D.

System 100 may be deployed, for example, at a presentation hall. In that embodiment, content sources 102 may be video cameras 104 capturing various angles of the presentation event and producing audio-video signals. The various angles of the presentation event may include media streams covering the presenter, the presentation slides, the audience members etc. In addition, content sources 102 may include data sources 104, such as social media platforms (Twitter, Facebook, Youtube, other websites etc.) providing live tweets, comments, pictures, videos etc. of the live presentation event from the audience members. Content sources 102 may further include advertiser data for individuals or companies sponsoring the presentation event, and may include logos, promotions, advertisements, etc. for those advertisers. This embodiment is further explored in FIG. 5A.

System 100 may be deployed to provide coverage of any live event, such as, concerts, public speeches, public appearances, marathons etc.

Generally, an operator may use control station 140 to receive content streams from various content sources 102 via network 120 during a live event. The control station 140 operator reviews the incoming content streams and operates on one or more content streams to generate one or more derived media clips.

In some cases, the derived media clip is a highlight clip of the event. In some other cases, the derived media clip is a feed of the entire event with or without some edits, such as insertion of logos, names, scores etc. In some further cases, the derived media clip may be any clip of interest that is generated about the live event. For example, for a sporting event, the derived media clip may be a replay clip of an interesting play in a game, such as a touchdown, a goal, a fight in the game etc. The derived media clip may also be a clip about a player of interest in the sporting event.

In another example, such as a concert event, a derived media clip may be generated and may include a highlight of singer's best performance of the night along with audience reactions. In a further example, such as a public speech by a famous person, a derived media clip may include highlights of the main points of the speech along with some fact check information and reactions from some media personnel.

As mentioned above, for a given event, any number of derived media clips can be generated. The operator may further direct the derived media clips to be output to an output node 160. The derived media clips may also be stored on the storage server 130 via network 120. In some cases, the derived media clips may be encoded for convenient transmission and/or storage.

In some cases, the operator of the control station 140 may also access the content stored in the storage server 130 to generate the derived media clips. The operator may use the control station 140 to review the content streams stored in storage server 130, select portions of the content streams, edit and assemble the content streams in an order of interest, and retrieve or record the modified content streams as derived media clips. The operator may further direct that derived media clips be output to an output node 160 and/or saved on the storage server 130 via network 120. In some cases, the derived media clips may be encoded for convenient transmission and/or storage.

In some cases, derived media clips may be stored in the storage server 130 as separate objects copied from the content streams and/or content objects. Preferably, derived media clips need not be copied and stored separately from the content objects, but can instead be referenced according to start and stop time markers indicating the start and end positions of the clip in the content objects. In particular, the start and stop time markers may be timing references based on a timecode (timecode reference) embedded within the content objects. As described, such timing references and timecodes can be synchronized among two or more content objects stored at the storage server 130, allowing for convenient retrieval of frames corresponding to the same timecode.

In some cases, when a request for a derived media clip is received by storage server 130, storage server 130 can determine the relevant content objects and timecode references from the request and the start and stop time markers identified in the request, retrieve the relevant derived media clip and transmit the requested derived media clip to the requesting device, or to another device specified in the request.

In some cases, decoders can receive derived media clips from storage server 130 through the network 120 via output node 160. The decoders can be configured to decode the derived media clips to provide decoded media clips to devices coupled to the decoders. For example, if a derived media clip is encoded in the MPEG-4/AVC compression format, decoder can decode the derived media clip and generate a corresponding SDI or HD-SDI output signal.

Similarly, renderers (not shown) can be coupled to network 120 and can also receive derived media clips from storage server 130 through the network 130. The renderers can be configured to decode the derived media clips and render the derived media clips for display on a display, such as a television, a computing device or the like. In some cases, renderers can be provided in software or hardware at control station 140. For example, one renderer may comprise video streaming software.

In general, the operator of the control station 140 receives live content streams 110, including live angle streams capturing the event from different angles, audio streams from the event and other data and/or ancillary streams, from various content sources 102.

The operator selects the live angles of interest by switching between the content streams 110 displaying the angles of interest. As the operator selects different content streams, the operator may also select a transitioning operation between those selections. For example, the operator may select a fading transition from a first selected content stream to the next selected content stream. In another example, the operator may simply select a switching in and out operation from the first selected content stream to the next selected content stream. Other transitioning operations may include cross-fading, side-by-side display, video-in-video display, etc. The transitioning operations may be selected to smooth out the transitions between the scenes and make the corresponding end product, i.e. the derived media clip, a good quality clip for user satisfaction.

The operator may additionally select content streams corresponding to data and/or ancillary streams to display additional information about the event, such as audio from the commentators, scoreboard information, logo of advertisers etc. The operator further selects time placement of the data and/or ancillary streams in relation to other selected streams, such as the various live angle streams discussed above.

The operator may also select how the various streams are combined to generate the derived media clip. The operator may select combination operations, such as muting, fading etc., to combine various streams. For example, the operator may choose to mute a portion of the live angle stream to overlay an audio stream from the commentators while still displaying the gameplay in the live event facility, such as the court, field, stadium or the arena.

In addition to facilitating the selection and combination of various content streams to generate the derived media clip, control station 140 of system 100 also generates an annotated timeline of the derived media clip as the derived media clip is being created. The various content stream selections, transitioning operations, and combination operations are saved on a timeline to provide a representation of the derived media clip.

The annotated timeline comprises a time segment containing time references, and indications of selected content streams, transitioning operations and combination operations in relation to the time references. The placement of the selected content streams, transitioning operations and combination operations on the timeline indicates the time and sequence (or order) of their occurrence in the derived media stream.

The generation of the annotated timeline may provide the advantage of timely review and instant editing of the derived media stream to correct any errors and/or improve the quality of the derived media clip, such as by improving the choice of angle for display.

The annotated timeline may allow an operator to simply swap out an existing content stream for a different content stream in the derived media clip. For example, if the operator realizes that a better angle coverage of a sub-event within the event is available, such as a better angle of a goal, a fumble, a tackle, a touchdown, an interception, a point after kick, a missed catch or any sub-event of interest, then the operator may swap out the existing content stream for that sub-event on the annotated timeline with a new content stream containing a better angle of the sub-event. In this example, the operator may provide user input including a first identifier and a second identifier to indicate the target content stream (to be swapped) and the new content stream respectively. The new content stream may be available from the content sources 102, from the storage server 130, or from an external source.

In some cases, the content stream identified on the annotated timeline may be represented in terms of a content identifier, identifying the content source from which the corresponding stream originated. In addition to the content identifier, the annotated timeline may also include a start and stop time marker indicating a start and end position within the content stream, where the start and end position refers to the content of interest to be included in the derived media clip. The start and stop time markers may be timing references based on a timecode (timecode reference) embedded within the content streams.

Figure 2:
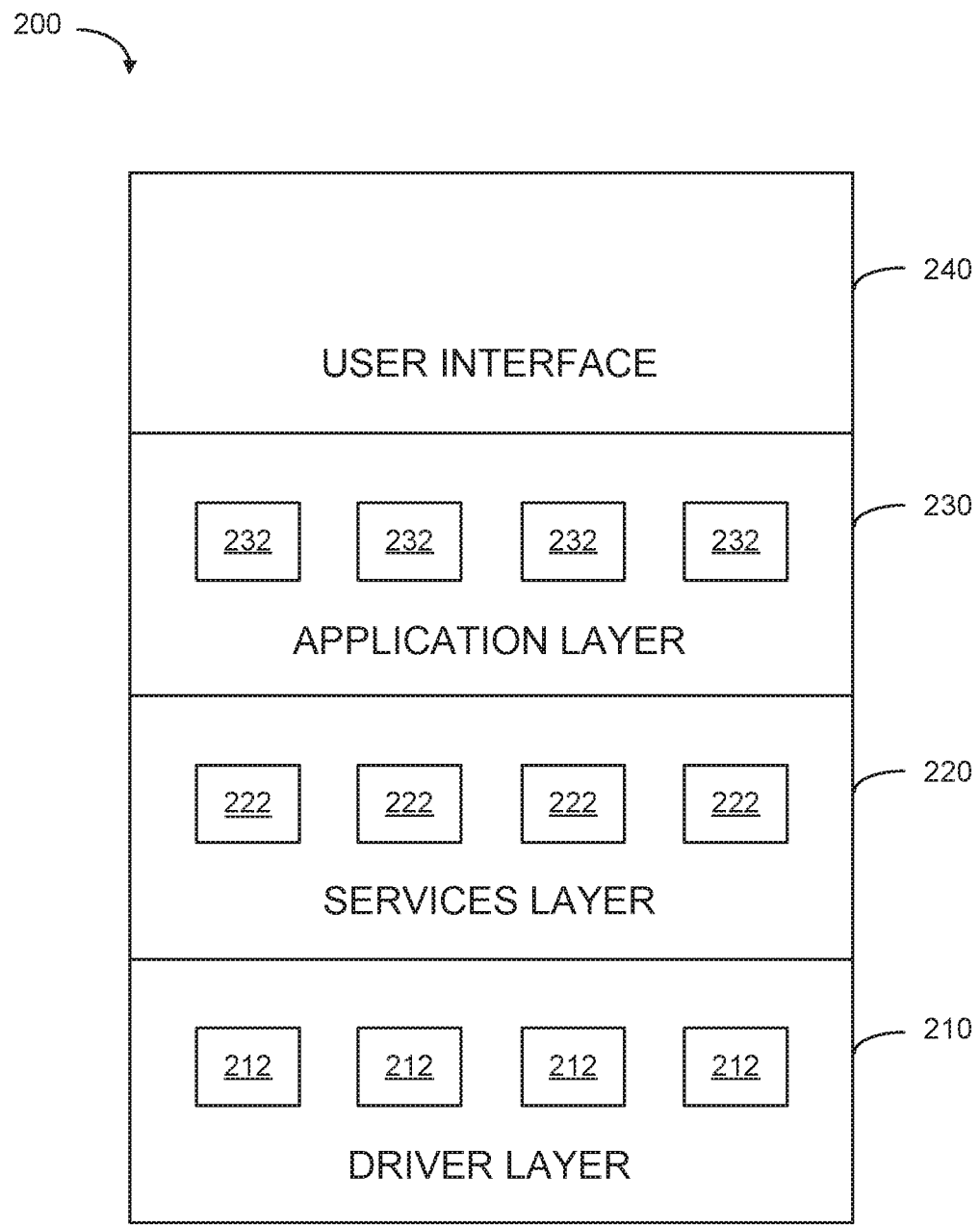
FIG. 2 is a block diagram illustrating an example software stack for a control station.

Referring now to FIG. 2, there is illustrated a block diagram illustrating an exemplary software stack 200 for a control station, such as control station 140.

Software stack 200 generally comprises a driver layer 210, a services layer 220, an application layer 230 and a user interface layer 240.

Driver layer 210 may comprise one or more driver modules 212, for interfacing with various hardware and network devices provided at control station 140, such as a processor, memory, display, input device and network device. In some cases, the driver modules 212 may provide an interface for other devices communicatively coupled to the control station. For example, a driver module may provide an interface for a network-based file system.

Services layer 220 may comprise one or more services module 222, for providing system-level services, such as encoding, decoding and rendering media files.

Application layer 230 may comprise one or more application modules 232. Each of the application modules 232 may provide specific functionality to the control station. For example, an application module may provide live playback of a content stream, wherein a selected content stream can be rendered and displayed on a display of the control station. Another application module may provide playback of a derived media clip. Yet another application module may display a list of available content objects in the storage server 130. Yet another application module may enable an operator to browse and update metadata relating to content streams or content objects. Additional examples of application modules include: video router control modules, infrastructure equipment control modules, video equipment configuration module (e.g., providing adjustment of chroma/luma gain in video), media asset management modules, video server access modules, remote desktop control modules (e.g., VNC), encoder/decoder configuration modules, digital signage control modules, media wall control modules, and other 3$^{rd}$ party interface modules. It will be appreciated that any number of application modules can be provided and that application modules can be designed to use the services provided by services layer 220, driver layer 210, user interface 240 and even other application modules. Application modules thus enable the functionality of control station 140 to be expanded and extended.

In one example, an application module 232 may provide a metadata input interface, displayed on a display of the control station. If the control station is equipped with a touchscreen display, the metadata input interface may utilize the touchscreen display to accept input. The metadata input interface may be configured for a specific type of metadata input. For example, if the metadata relates to content streams or content objects of a baseball game, the metadata input interface may comprise input options relating to baseball statistics, plays and players. Accordingly, an operator of the control station and the metadata input interface can easily enter metadata relating to a content stream or content object as it is viewed by the operator on a display of the control station.

Metadata input interfaces can be customized for a variety of content categories. For example, content streams or objects relating to sports, such as football, basketball, hockey, etc., may have metadata input interfaces tailored to facilitate efficient input of statistics, plays and players. Content streams or objects relating to entertainment or news may similarly have customized metadata input interfaces. For example, content streams or objects relating to live awards shows for the entertainment industry may have metadata input interfaces tailored to facilitate efficient input of award names, recipient names and the like.

In some cases, as the metadata is entered, control station can determine the current timecode reference of a content stream or object playing back in an associated display viewport, and both the entered metadata and the current timecode reference can be automatically associated with the respective content stream or object. In other cases, an operator may specify both the metadata and a content object (which may be identified by one or more timecode references) with which the metadata should be associated.

User interface layer 2540 generally cooperates with driver layer 210, core services layer 220 and application layer 230 to manage and render a user interface for display on a display device of the control station. The operation of user interface layer 240 is described in further detail herein.

Figure 3A:
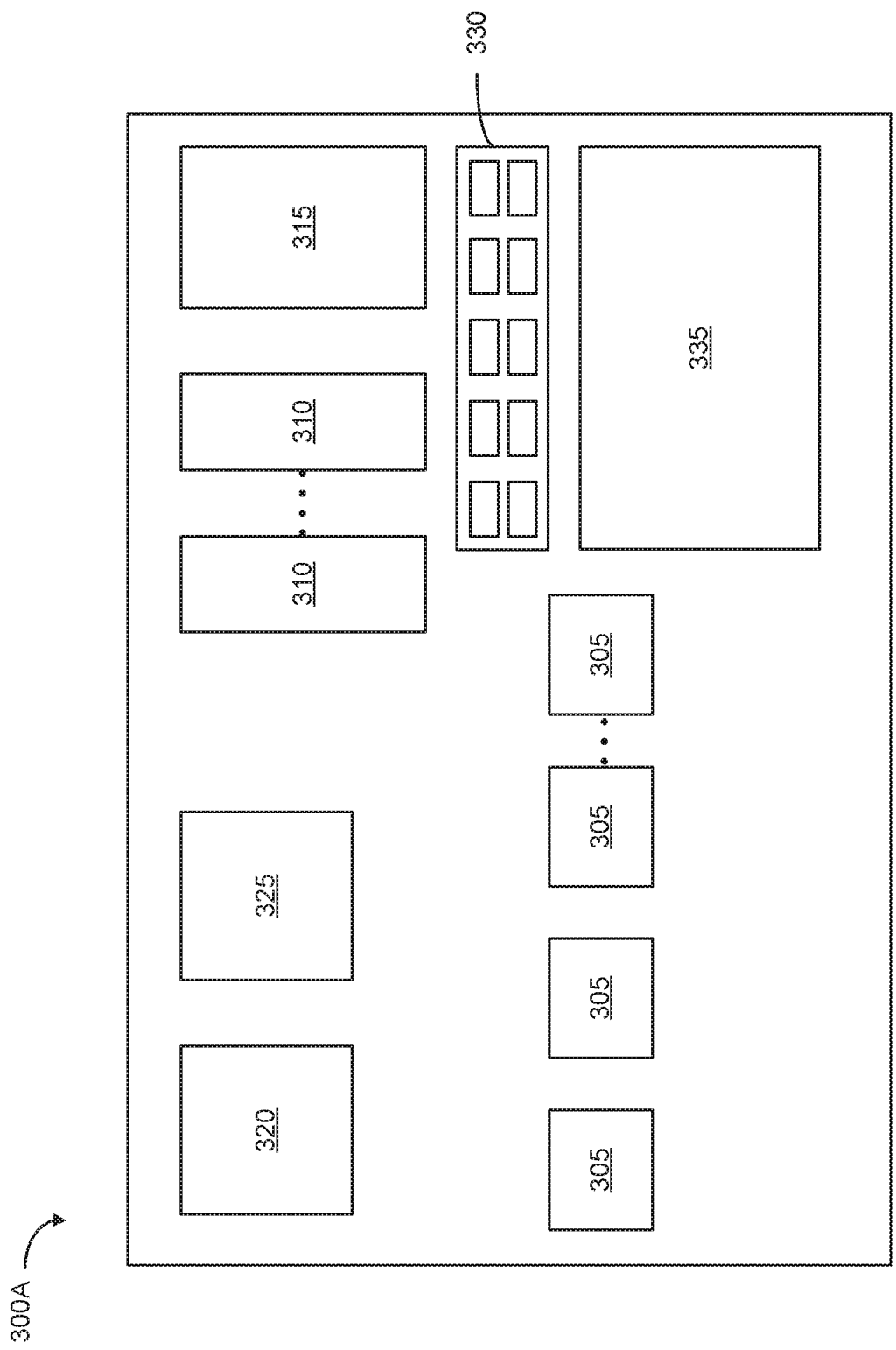
FIG. 3A illustrates a user interface according to a first example.

Reference is next made to FIG. 3A, which illustrates a user interface 300 according to an example. User interface 300 may be generated by a user interface layer, such as the user interface layer 240 of FIG. 2.

User interface 300 comprises one or more viewports, each of which may be generated by an application module, such as an application module 232.

In some cases, viewports may be arranged and rearranged in the user interface 300, based on operator input. In other cases, viewports may be arranged according to a predetermined pattern or template, which may be context-specific or operator selectable. For example, in one context of metadata input, one viewport arrangement could display a viewport displaying a live content stream, another viewport displaying stored content object and a metadata input interface viewport. Another viewport arrangement could display live content streams and an output stream viewport.

In the example shown, viewports 305 display live content streams. For example, viewports 305 display live media streams that may correspond to separate media sources (e.g., television cameras). Viewports 305 may also display live audio streams corresponding to the live event. In addition, viewports 305 may display media streams recorded by viewers or audience members on their personal devices and made available to online social media platforms or websites etc. Viewports 305 may additionally display live data streams, such as scoreboard information, live tweets, Facebook comments etc. Other content, such as advertiser streams, as discussed above, may also be displayed on viewports 305.

Viewport 310 is configured to display non-live content, such as content objects received from the storage server 130. The control station may receive input with instructions to "scrub" (e.g., advance frames forward or backward) through the media streams displayed in viewport 310. In response to the input instructions, the control station may request content objects from the storage server 130 to be decoded and rendered in the appropriate viewport. Optionally, viewport 310 may be configured to synchronize display of two separate content objects, such as media streams, for example based on timecode. Accordingly, if an operator wishes to review an event that was recorded in two media streams, both media streams may be shown in synchronization as they are played back or scrubbed through.

For ease of exposition, only a few representative viewports 305 and 310 are shows, but additional viewports may also be opened.

Viewport 315 may comprise a user-selectable list of content objects stored at a storage server. In some cases, viewport 315 may also display icons associated with the content objects. In some other cases, viewport 315 may display a list of content objects along with corresponding metadata items.

Viewport 330 may be configured to display an input interface. The input interface may comprise user interface elements, such as buttons, slider controls, text fields, and the like. The input interface can be configured to provide control over other viewports of the user interface 300. In one example, the input interface comprises playback controls. In another example, the input interface comprises a metadata input interface. In additional examples, viewport 330 may include elements, such as buttons, corresponding to transitioning and combination operations as discussed above. The user interface elements may be hard or soft elements, i.e. user interface elements may correspond to hardware elements, software elements or a combination of both.

Viewport 335 may be configured to display a derived media clip. Alternately, viewport 335 may be configured to only display the annotated timeline corresponding to the derived media clip. The display of the viewport 335 may be streamed to an output node.

Viewport 320 may be configured to display an operator selected content stream or content object to be added to the derived media clip being generated. Viewport 325 may be configured to display a preview of the selected content stream or content object displayed on viewport 320.

Figure 3B:
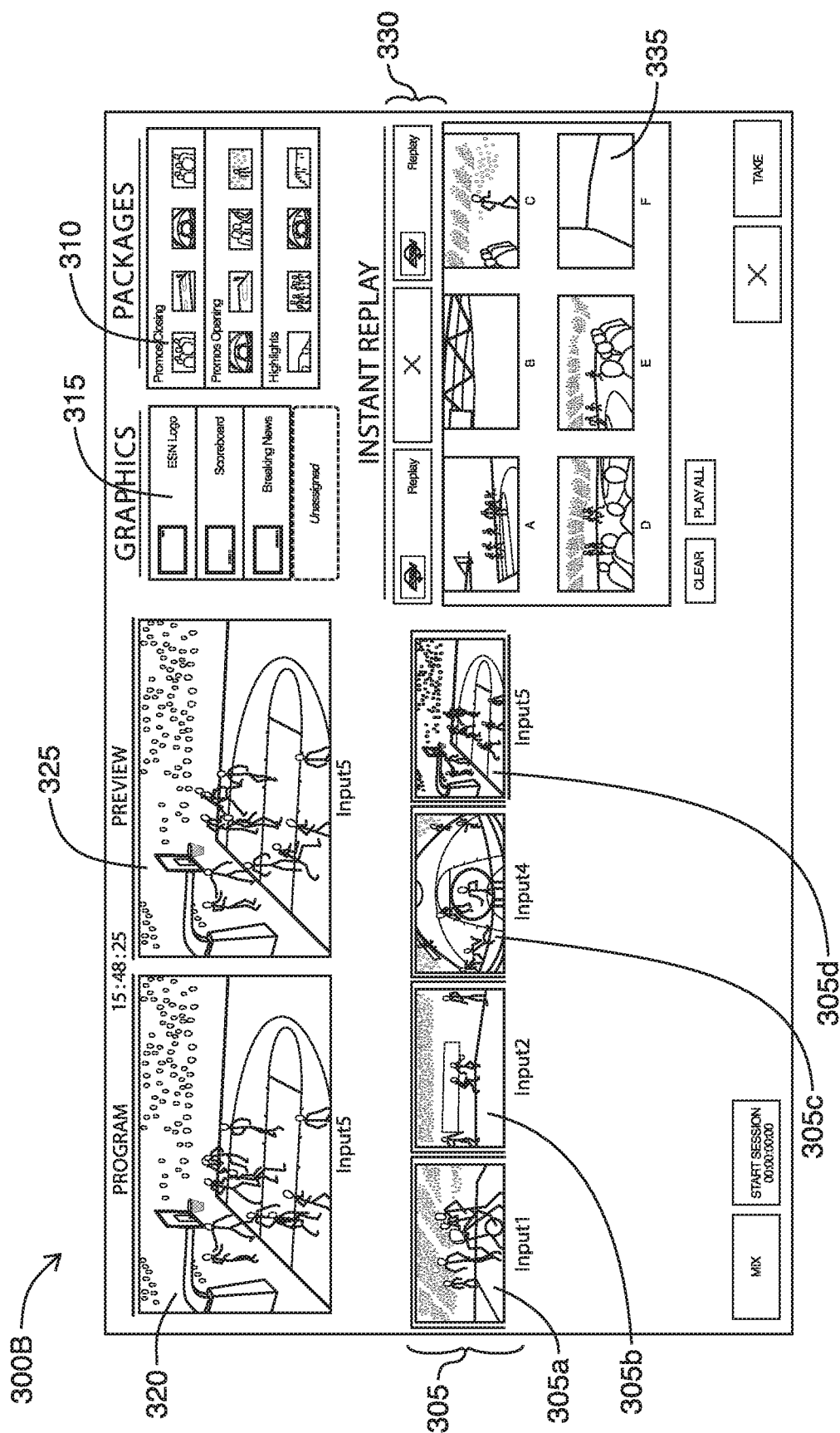
FIG. 3B illustrates a user interface according to a second example.
Figure 3C:
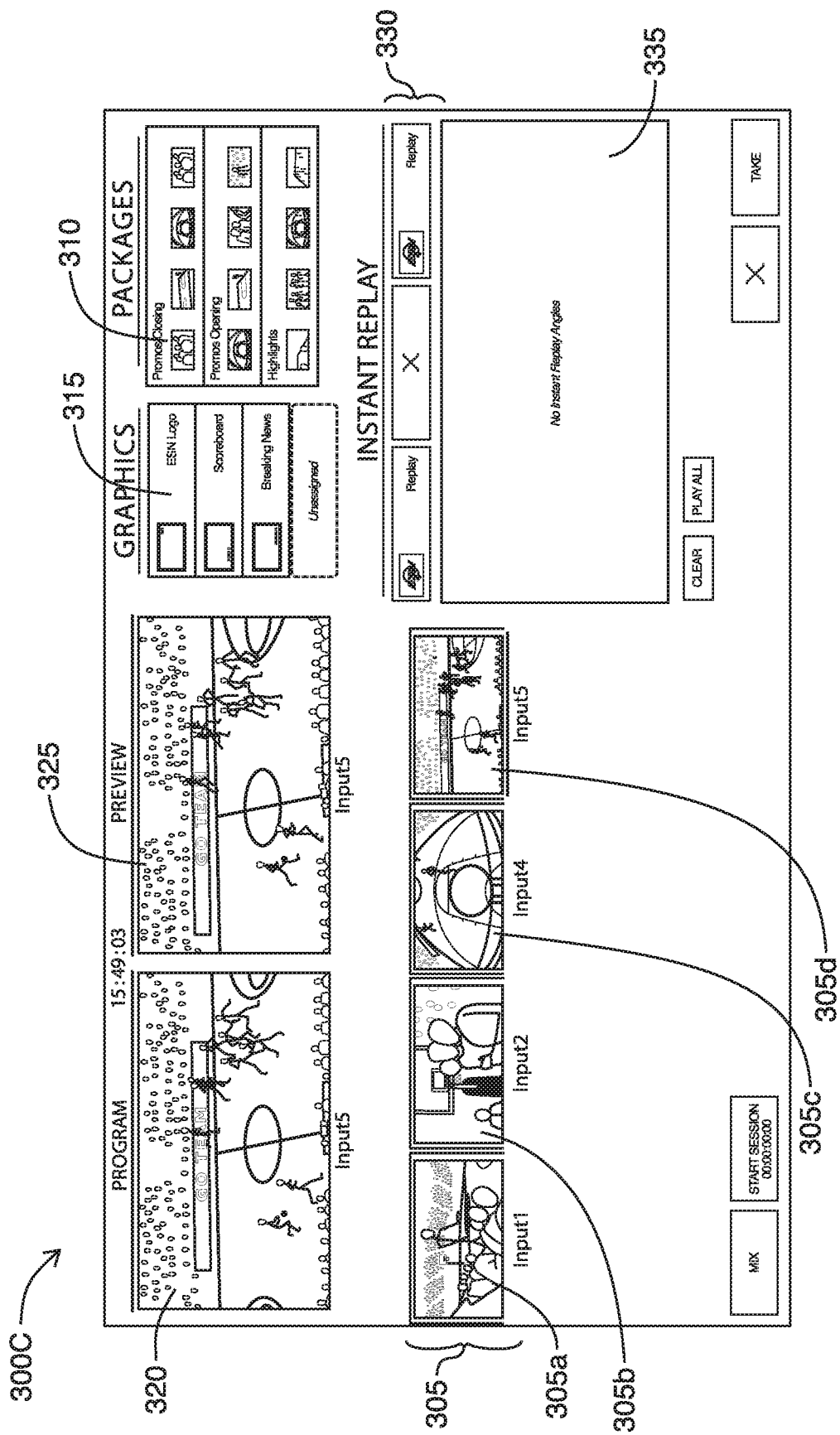
FIG. 3C illustrates a user interface according to a third example.
Figure 3D:
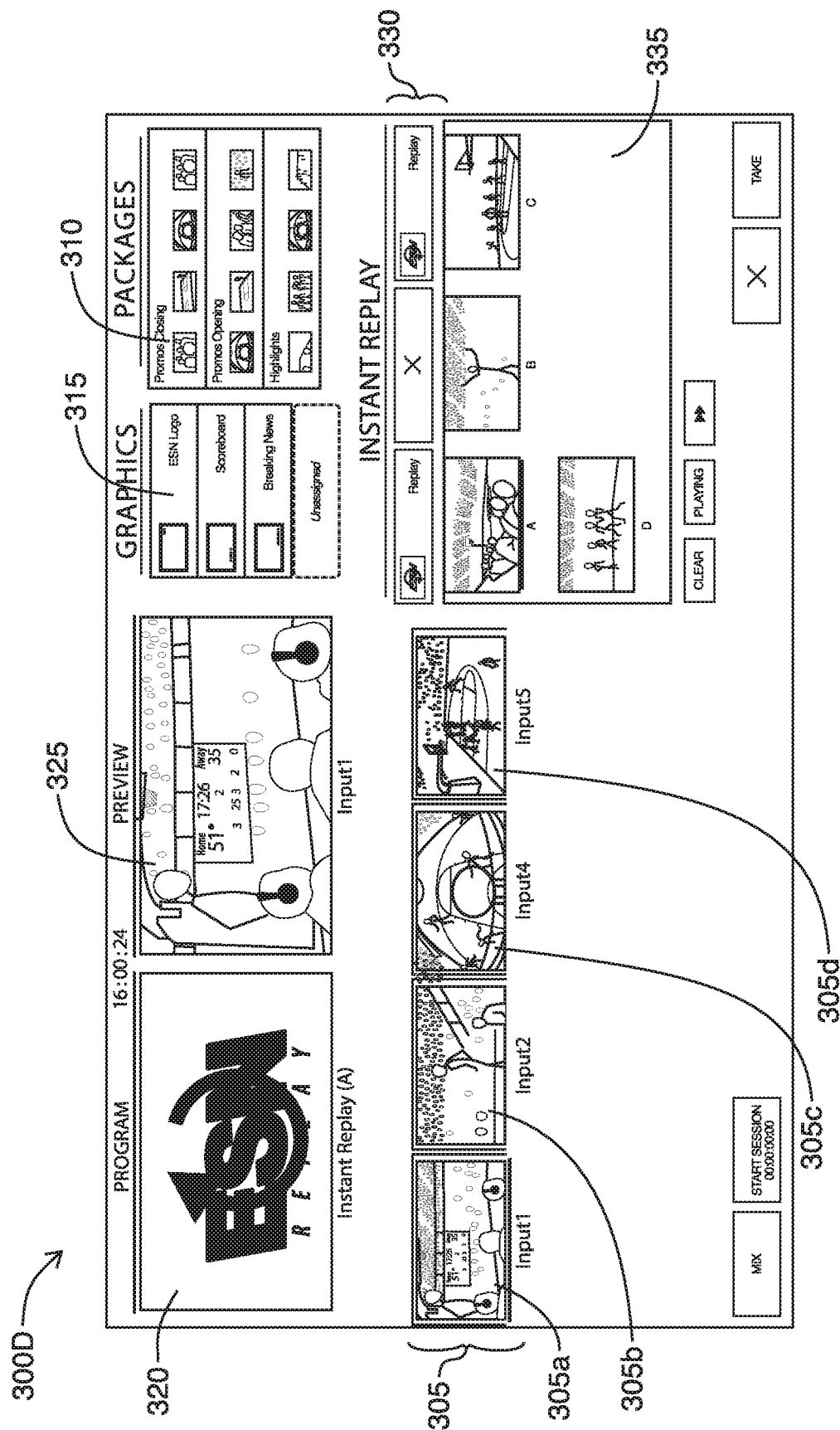
FIG. 3D illustrates a user interface according to a fourth example.

Reference is next made to FIGS. 3B-3D, illustrating user interfaces 300B, 300C and 300D, respectively, according to different example embodiments. User interfaces 300B-300D illustrate various steps in the creation of a derived media clip.

User interface 300B illustrates viewports 305 displaying live media streams received from various content sources. As illustrated, viewport 305a is configured to display live media stream 1 from input source 1, viewport 305b is configured to display live media stream 2 from input source 2, viewport 305c is configured to display live media stream 3 from input source 4 and viewport 305d is configured display live media stream 4 from input source 5.

Viewport 310 is configured to display non-live content, such as content stored in the storage server 130. Content displayed in viewport 310 may include pre-produced packages, such as highlight clips, opening and closing promotion clips, etc.

Viewport 315 is configured to display live data streams, such as scoreboard data, news data etc. In addition, viewport 315 is configured to also display some non-live content, such as graphics content, stored in the storage server 130. Graphics content may include logos, branding and other related content.

In some alternate embodiments, live content is displayed separately from non-live content.

Viewport 320 is configured to display content stream or objects selected by the operator for including in the derived media clip. Viewport 325 is configured to display a preview of the selected content displayed on viewport 320.

Viewport 330 is configured to display an input interface having many user interface elements, such as buttons, sliders etc. In the illustrated embodiment, viewport 330 may include a 'switching' button indicating the switching operation between clips.

Viewport 335 is configured to display a derived media clip. In the illustrated embodiment, the derived media clip is displayed in terms of various selected content streams and/or content objects provided in a particular sequence.

In user interface 300B, content from input source 5 being displayed in viewport 305d is selected for inclusion in the derived media clip. Selection of this content is reflected on viewport 320. In addition, this content can be previewed in viewport 325.

In user interface 300C, content from input source 5 being displayed in viewport 305d continues to be selected, as reflected in viewport 320, and previewed in viewport 335. In user interface 300D, content from input source 1 is being displayed in viewport 305a. This content is being selected by the operator and being reviewed on viewport 325. User interface 300D also illustrates that the derived media clip in viewport 335 is complete and ready for playback.

Figure 4:
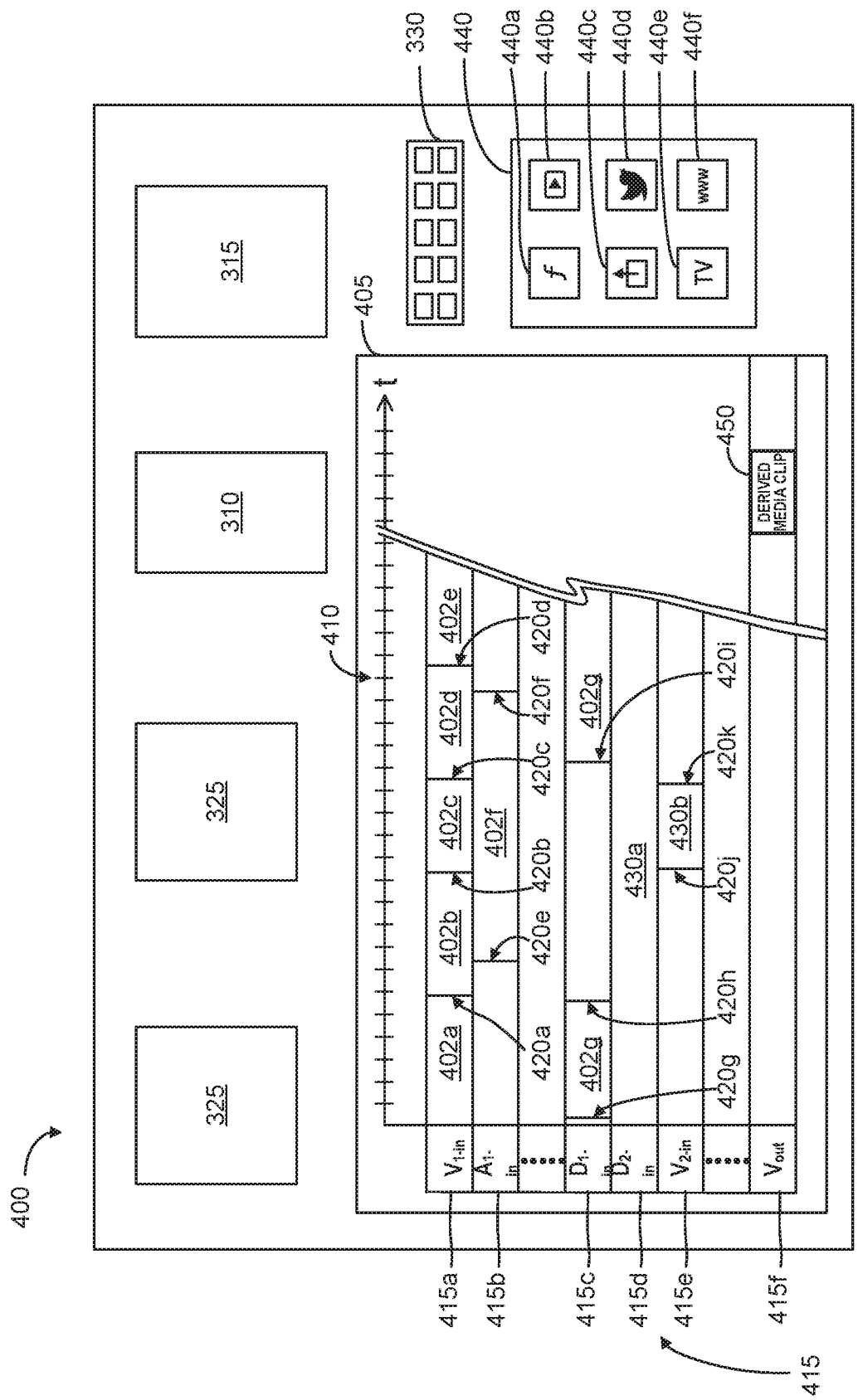
FIG. 4 illustrates an example of user interface displaying an annotated timeline of a derived media clip.

Reference is next made to FIG. 4, which illustrates a user interface 400 displaying an annotated timeline 405, according to an example embodiment. As shown, user interface 400 may include some or all of the viewports, such as the viewports illustrated in FIGS. 3A-3D, used during the generation of the derived media clip.

Annotated timeline 405 includes a time segment containing timing references 410. Annotated timeline 405 also identifies various channels 415 accessible by the control station as inputs for creating a derived media clip. In the illustrated embodiment, annotated timeline 405 is generated for a sporting live event.

As illustrated, channel 415a corresponds to live media streams received by the control station from various content sources, such as content sources 102 of FIG. 1. The live media streams may correspond to streams from various cameras covering various angles of the event. Channel 415b corresponds to live audio streams received by the control station from various content sources, such as content sources 102 of FIG. 1. The live audio streams may correspond to audio generated by commentators at the live event. Channel 415c corresponds to live data streams received by the control station from various content sources, such as content sources 102 of FIG. 1. Live data streams may correspond to scoreboard data showing the scores of the live event. Channel 415d corresponds to non-live data streams received by the control station from a storage server, such as storage server 130 of FIG. 1. The non-live data stream may correspond to graphics data, such as logo, branding etc. Channel 415e corresponds to non-live media streams received by the control station from a storage server, such as storage server 130 of FIG. 1. The non-live media streams may correspond to media streams of the participating teams at a previous game earlier in the year, or in a previous year. Channel 415f corresponds to the derived media clip 450 generated by the control station for transmitting to the output node. The derived media clip may be a replay video of a touchdown sub-event that has recently occurred in the live event.

As shown, channel 415a illustrates various media streams that are switched in and out at specific times to generate the derived media clip. As shown, at time 420a, the media stream corresponding to a first media source 402a is switched out for media stream corresponding to a second media source 402b. Similarly, media streams corresponding to the second media source 402b is switched out at time 420b for the media stream corresponding to a third media source 402c. Shortly thereafter, at time 420c, the media stream corresponding to the third media source 402c is switched out for the media stream corresponding to the fourth media source 402d. At time 420d, the media stream corresponding to the fourth media source 420d is switched out for the media stream corresponding to the fifth media source 402e.

The various media sources 402a-402e may correspond to content sources, such as content sources 102 from FIG. 1, covering the sporting event from various angles. The switching in and out of the media sources 402a-402e at specific times with references to the timing references 410 of time segment indicates the sequence and placement of the media streams as they appear in the derived media clip.

As shown, channel 415b illustrates that audio stream from audio source 402f is selected between a first time 420e and a second time 420f. Outside of this selection, no other additional audio stream is selected for inclusion in the derived media clip. In some cases, the operator may select to mute or lower the audio of the live media streams at channel 415a from time 420e to time 420f, and instead play the audio from audio source 402f in that time. The audio from the audio source 402f may be the audio from the commentators that may be of interest to the viewers of the derived media clip.

As shown, channel 415c illustrates that live data stream from a data source 402g is selected from time 420g to time 420h, and then again from time 420i onwards. The live data stream being received from the data source 402g may correspond to scoreboard information being received directly from the scorekeeper's computing devices. Alternately, scoreboard data may be received by the control station as a media stream if a camera pointing at the scoreboard provides the corresponding stream to the control station.

As shown, channel 415d illustrates that non-live data, such as graphics data, is received from a storage source 430a, such as a storage server 130 of FIG. 1. As illustrates, the graphics data stream is selected from time 420g onwards. This may be so, for example, because the channel on which the derived media clip is to be displayed to the viewers requires its logo to always appear on the clip.

As shown, channel 415e illustrates that non-live media streams are received by the control station from a storage source 430b, such as the storage server 130 of FIG. 1. In the illustrated embodiment, the non-live media stream is selected form time 420j to time 420k. The non-live media stream may be a clip of a touchdown or any other sub-event form a previous event between the current participating teams.

As shown, the derived media clip 450, which is formed by the combination of the inputs from channels 415a-415e, at the time and sequence illustrated on the annotated timeline 405 is positioned for transmission to the output node at time 420j.

The annotated timeline 405 may be accessible for editing in real-time or with some minor delays. In one scenario, the derived media clip 450 may be produced almost instantaneously with the live event but may not be released right away. In such scenarios, the annotated timeline 405 for the derived media clip may be revisited and edited to fix errors or to improve the clip. The derived media clip 450 can be later released on a social media platform, online or on a television channel, etc.

As illustrated in FIG. 4, the user interface 400 may also include a viewport 440 including various icons 440a-440f that may represent the output node for the derived media clip 450. For example, the operator may select to post the derived media clip 450 on one or more social media platforms such as Facebook, Twitter, Youtube etc. In this example embodiment, the operator may select these social media platforms by selecting icon 440a for Facebook, 440b for Youtube and 440d for Twitter. The operator may select icon 440c to save the derived media clip on the storage server. The operator may likewise select icon 440e to release the derived media clip on a television channel and icon 440f to release the derived media clip on an online website. The operator may simultaneously select one or more output nodes 440.

In another scenario, the derived media clip may be edited live, with a delay of just a few seconds or minutes, or frames, in relation to the live event. For instance, one operator may produce the derived media clip by preparing the annotated timeline 405 for that clip, and another operator may check the annotated timeline 405 and instantaneously comment on the changes required to the annotated timeline 405. In such embodiments, either the first or the second operator (in some cases, the same operator may be responsible for both the tasks of generating and editing the derived media clip) may switch out, add to, or delete from any one or more of the streams received from the sources 402a-402g or 430a-430b for other streams that may provide a better angle of view, correct erroneous information, or add or remove information from the derived medial clip being generated.

In another scenario, where the live replay or instant playback is not that essential and a delay of a few minutes or an hour or half a day is acceptable, the first version of the derived media clip, as generated simultaneously as the live event, may be buffered. This allows for the operator or another person to revisit the timeline and edit it before release. Such a scenario may include a high school football game, where instant release of the derived media clip, such as the highlight clip or instant playback clip, is not required.

In the various scenarios illustrated herein, one or more derived media clips may be generated with modifications and improvements over each other. Furthermore, the one or more derived media clips may be released on one or more platforms, either right away as soon as the clip is generated, or with minor insignificant delays of a few seconds, few minutes or few frames in relation to the live event, or with a bit more substantial delay of about half an hour, an hour or so, or with a more sustained delay of days, months, years etc. Furthermore, the various scenarios illustrated herein are examples only. Any variation, deviation or combination of these scenarios may also be possible.

In various cases, the one or more derived media clips, and their corresponding annotated timelines, are stored on a storage server, such as the storage server 130 of FIG. 1. In some other cases, only the annotated timelines for one or more derived media clips are stored on the storage server, where the annotated timelines include references to content objects stored in the storage server, the relevant start and stop time markers for the various content objects identified in the annotated timelines, and the sequence and time placements of the identified content objects in relation to a timing segment representing the time duration of the derived media clip.

Figure 5A:
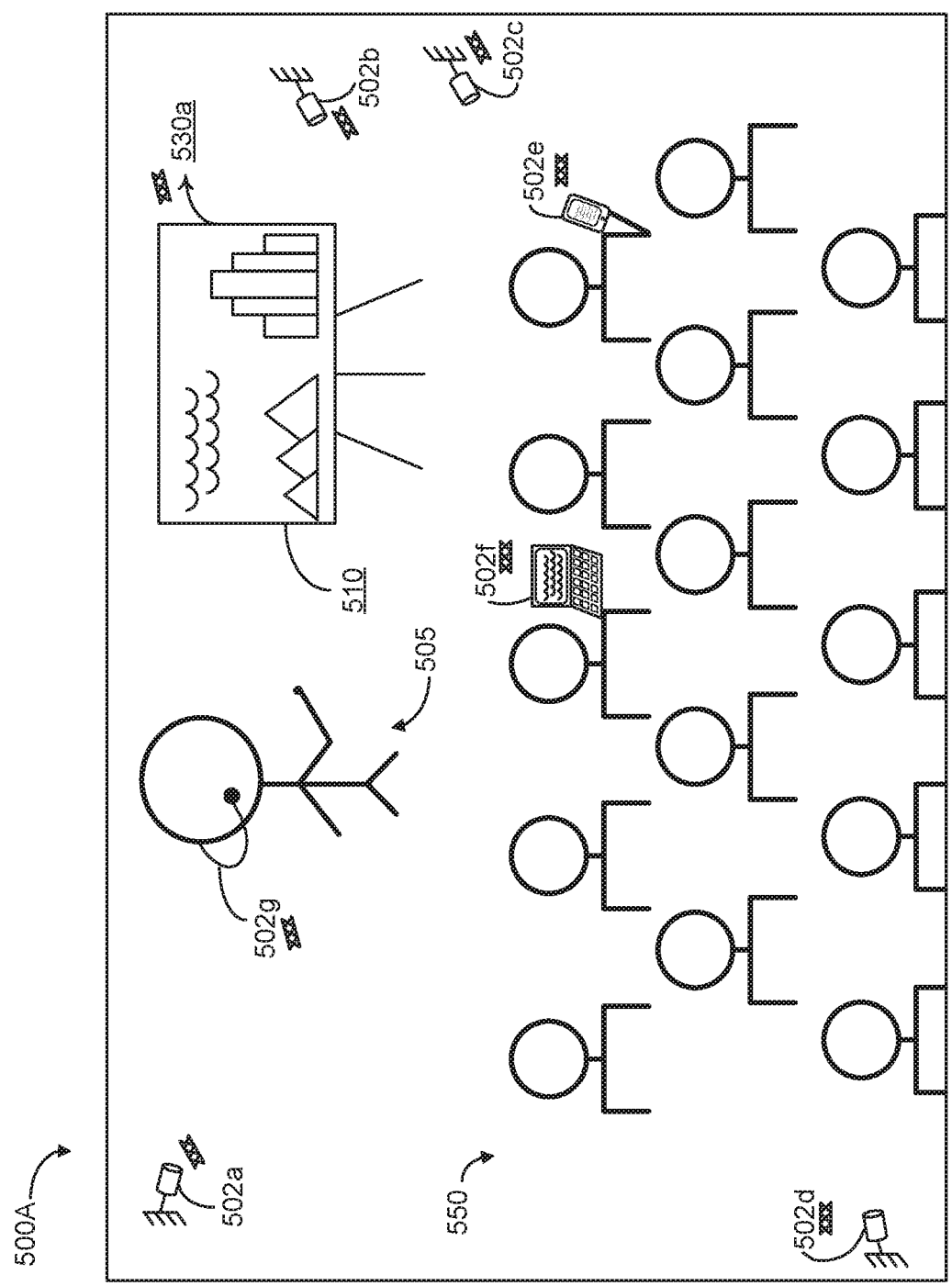
FIG. 5A illustrates an example of a system 500 for generating and managing a derived media clip at an event.
Figure 5B:
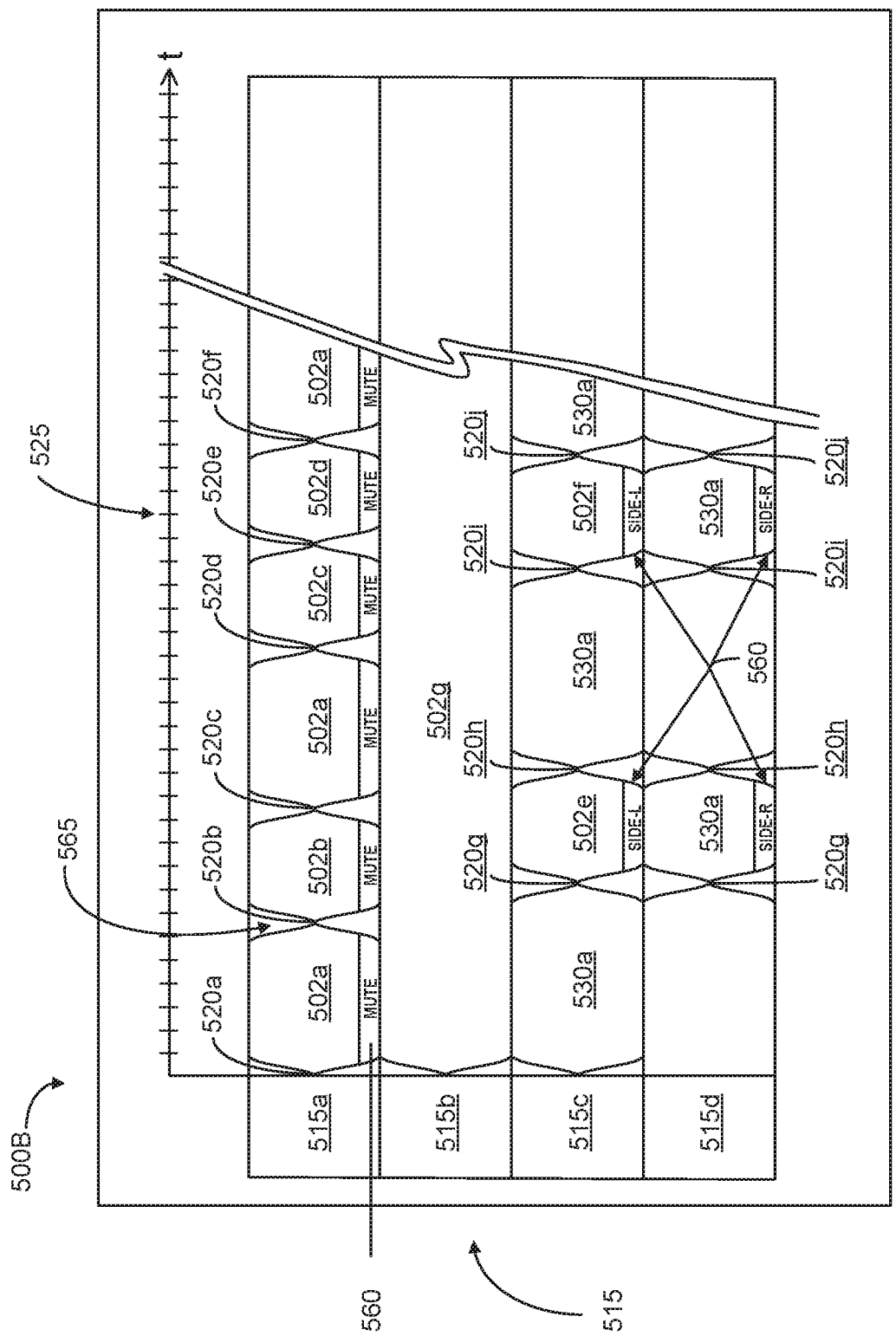
FIG. 5B illustrates an example of an annotated timeline of a derived media clip for system 500.

Reference is next made to FIGS. 5A and 5B illustrating another example scenario of the various teachings herein in the context of a live presentation event. FIG. 5A illustrates an example of a system 500A for generating and managing a derived media clip at a presentation event. FIG. 5B illustrates an example of an annotated timeline of a derived media clip for the event corresponding to system 500A.

System 500A illustrates a presentation event, where the presenter 505 is presenting materials being displayed on a display screen 510 on a stage, and audience members 550 are facing the stage to watch the presenter 505 and the presentation materials 510. System 500A includes a first camera 502a, a second camera 502b, a third camera 503a and a fourth camera 504d. First camera 502a is fixed on the presenter 505 and is configured to capture the presenter 505 in terms of his movement on the stage, his expressions, his hand movements etc. Second camera 502b is fixed on the display screen 510 to capture the presentation material being presented to the audience materials 550. Third camera 502c is located close to the stage to capture the audience members from the front. Fourth camera 502d is located closed to the back and is configured to capture the audience members from the back and/or the side.

Also illustrated in system 500A is a handheld device 502e, such as a smartphone, being operated by an audience member. System 500A also illustrates a laptop 502f being operated by another audience member. The handheld device 502e and the laptop 502f may be used for live written commentary on social media platforms. In addition, handheld device 502e and/or laptop 502f may also be used to capture images and videos of the presenter 505, audience members 550 and/or presentation materials 510 etc., during the presentation. System 500A also illustrates a microphone 502g being used by the presenter 505 to amplify his voice so that he can be heard clearly in the presentation hall.

As shown, cameras 502a-502d, smartphone 502e, laptop 502f and microphone 502g become content sources for a control station, analogous to control station 140 of FIG. 1, to facilitate generation of a derived media clip. The derived media clip in this example may be a highlight clip for the presentation event.

In addition to the content sources above, the presentation materials 510 may be previously provided to the control station, and may be stored in a storage server 530a, such as the storage server 130 of FIG. 1, prior to the commencement of the presentation. Thus the storage server may be another source of content for the control station.

Reference is next made to FIG. 5B, illustrates an annotated timeline 500B comprising a time segment 525 and various channels 515 identifying the content streams or objects to be included in the derived media clip. Channel 515a corresponds to live media streams capturing various angles of the presentation event. Channel 515b corresponds to live audio stream from the presentation event. Channel 515c corresponds to a live data stream from the presentation event. Channel 515d corresponds to a non-live data stream form a storage server.

As shown, channel 515a illustrates that the media stream from source 502a is selected from time 520a to 520b. The media stream from source 502a is then switched out at time 520b for the media stream from source 502b. At time 520c, the media stream from source 502b is switched out for the media stream from the source 502a again. The media stream from the source 502a is then switched out at time 520d for media stream from source 502c. At time 520e, media stream from source 502c is then switched out for media stream from source 502d. The media stream from source 502d is then switched out at time 520f for media stream from the source 502a again.

As shown, channel 515b illustrates that the audio stream from source 502g is selected from time 520a onwards. The operator may choose to mute the audio of the media streams on channel 515a from time 520a onwards, and select the audio from the audio stream of channel 515b to play in the derived media clip instead. This may be because the audio stream from channel 515b may be of higher clarity and quality. In some cases, the combination operation 560, such as mute operation, is also illustrated on the annotated timeline 500B in relation to the timing references 525 to which it applies.

As shown, channel 515c illustrates that some data object from the storage server 530a is selected from time 520a to 520g. The data object is then swapped out at time 520g for a data stream from source 502e. At time 520h, data stream from source 502e is swapped out for data objects from the storage server 530a. At time 520i, data object from the storage server 530a is then swapped out for data stream from source 502f, and then swapped back in at time 520j.

As shown, channel 515d illustrates that at time 520g, data object from storage server 530a is selected until time 520h, and then re-selected from time 520i to 520j. The operator at the control station may desire to show the data object from storage server 530a in collaboration with the data streams from the sources 502e and 502f, at times 520g-520h, and 520i-520j respectively. In one example, the operator may choose a combination operation 560 such as side-by-side display of the data object from storage server 530a and the data stream from source 502e at time 520g to 520h. In another example, the operator may choose a video-in-video or an image-in-video combination operation 560, where the data object from source 530a is displayed as a video or an image in the background video or image from data stream of source 502e. Other combination operations may be used.

It is worth noting that in the illustrated embodiment, and in the various teachings herein, other transitioning operations 565, i.e. other than switching in and out, may be used to transition from one source of content stream or object within a channel to another source of content stream or object. Other transitioning operations may include fading, cross-fading or other effects.

The annotated timeline 500B may be stored on the storage server for later retrieval, review and/or editing. The annotated timeline 500B may be edited by swapping out one or more content streams or objects within the channels for other content streams or objects. For example, the operator may swap a content stream on a given channel in the annotated timeline by submitting a user input including a first identifier identifying the content stream to be replaced and a second identifier identifying the new content stream. This may allow, for instance, a stream representing a particular camera angle, from a particular source to be replaced by another stream from another source by the operator. The annotated timeline 500B may also be edited to change or modify the transitioning operations and/or combination operations.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method for generating an annotated timeline user interface at a control station based on a plurality of content streams corresponding to a live event, the method comprising:

receiving the plurality of content streams from a plurality of content sources, each of the plurality of content streams comprising a plurality of intra coded media frames and one or more embedded timecode packets comprising timecode references associated with the plurality of media frames, wherein the embedded timecode references in each of the plurality of content streams are synchronized to a common time base;

displaying, at a display device of the control station, the plurality of content streams in one or more corresponding content viewports in the annotated timeline user interface;

receiving, from a user input device at the control station, a first user input including content identifiers corresponding to a plurality of selected content streams of the plurality of content streams, a queried start timecode and a queried end timecode, wherein each of the queried start timecode and the queried end timecode are referenced to the common time base;

identifying, for each of the plurality of selected content streams, one or more selected media frames having timecode references greater than or equal to the queried start timecode and less than or equal to the queried end timecode;

for each selected content stream, generating a corresponding media content portion comprising the one or more selected media frames identified for that selected content stream;

displaying, at the display device of the control station, the media content portions in the one or more corresponding content viewports;

receiving, from the user input device at the control station, a second user input comprising one or more combining operations for combining the media content portions; and responsive to the second user input, generating a derived media clip by combining two or more of the media content portions according to the one or more combining operations.

2. The method of claim 1, wherein:

the plurality of content streams comprise live content streams; and the one or more corresponding content viewports display the live content streams.

3. The method of claim 2, further comprising:
receiving a plurality of non-live content streams;
displaying a listing of the plurality of non-live content streams at a non-live viewport in the annotated timeline user interface;
receiving, from the user input device at the control station, a third user input corresponding to one or more selected non-live content streams in the plurality of non-live content streams; and
responsive to the third user input, generating the derived media clip by combining the one or more selected media frames and one or more selected non-live media frames associated with the one or more selected non-live content streams using one or more operations.

4. The method of claim 3, further comprising:
receiving a fourth user input from the user input device; and
responsive to the fourth user input, the one or more corresponding content viewports are rearranged in position in the annotated timeline user interface.

5. The method of claim 4, wherein generating the derived media clip is performed generally in real-time with the live event.

6. The method of claim 5, further comprising:
displaying an input interface comprising at least one of a button and a slider.

7. A system for generating an annotated timeline user interface at a control station based on a plurality of content streams corresponding to a live event, the system comprising:
a memory;
a display device;
a user input device;
a processor in communication with the memory, the display device, and the user input device, the processor generally configured to:
receive the plurality of content streams from a plurality of content sources, each of the plurality of content streams comprising a plurality of intra coded media frames and one or more embedded timecode packets comprising timecode references associated with the plurality of media frames, wherein the embedded timecode references in each of the plurality of content streams are synchronized to a common time base;
display, at the display device, the plurality of content streams in one or more corresponding content viewports in the annotated timeline user interface;
receive, from the user input device, a first user input including content identifiers corresponding to a plurality of selected content streams of the plurality of content streams, a queried start timecode and a queried end timecode, wherein each of the queried start timecode and the queried end timecode are referenced to the common time base;
identifying, for each of the plurality of selected content streams, one or more selected media frames having timecode references greater than or equal to the queried start timecode and less than or equal to the queried end timecode;
for each selected content stream, generating a corresponding media content portion comprising the one or more selected media frames identified for that selected content stream;
display, at the display device, the media content portions in the one or more corresponding content viewports;
receive, from the user input device at the control station, a second user input comprising one or more combining operations for combining the media content portions; and
responsive to the second user input, generate a derived media clip by combining two or more of the media content portions according to the one or more combining operations.

8. The system of claim 7, wherein:
the plurality of content streams comprise live content streams; and
the one or more corresponding content viewports display the live content streams.

9. The system of claim 8, wherein the processor is further configured to:
receive a plurality of non-live content streams;
display a listing of the plurality of non-live content streams at a non-live viewport in the annotated timeline user interface;
receive, from the user input device at the control station, a third user input corresponding to one or more selected non-live content streams in the plurality of non-live content streams; and
responsive to the third user input, generate the derived media clip by combining the one or more selected media frames and one or more selected non-live media frames associated with the one or more selected non-live content streams using one or more operations.

10. The system of claim 9 wherein the processor is further configured to:
receive a fourth user input from the user input device; and
responsive to the fourth user input, the one or more corresponding content viewports are rearranged in position in the annotated timeline user interface.

11. The system of claim 10, wherein the processor is further configured to generate the derived media clip generally in real-time with the live event.

12. The system of claim 11, wherein the processor is further configured to display an input interface on the display device, the input interface comprising at least one of a button and a slider.

13. The method of claim 1, further comprising displaying, at the display device of the control station, the derived media clip in a preview viewport in the annotated timeline user interface.

14. The system of claim 7, wherein the processor is further configured to display, at the display device, the derived media clip in a preview viewport in the annotated timeline user interface.

* * * * *